Patented Apr. 30, 1940

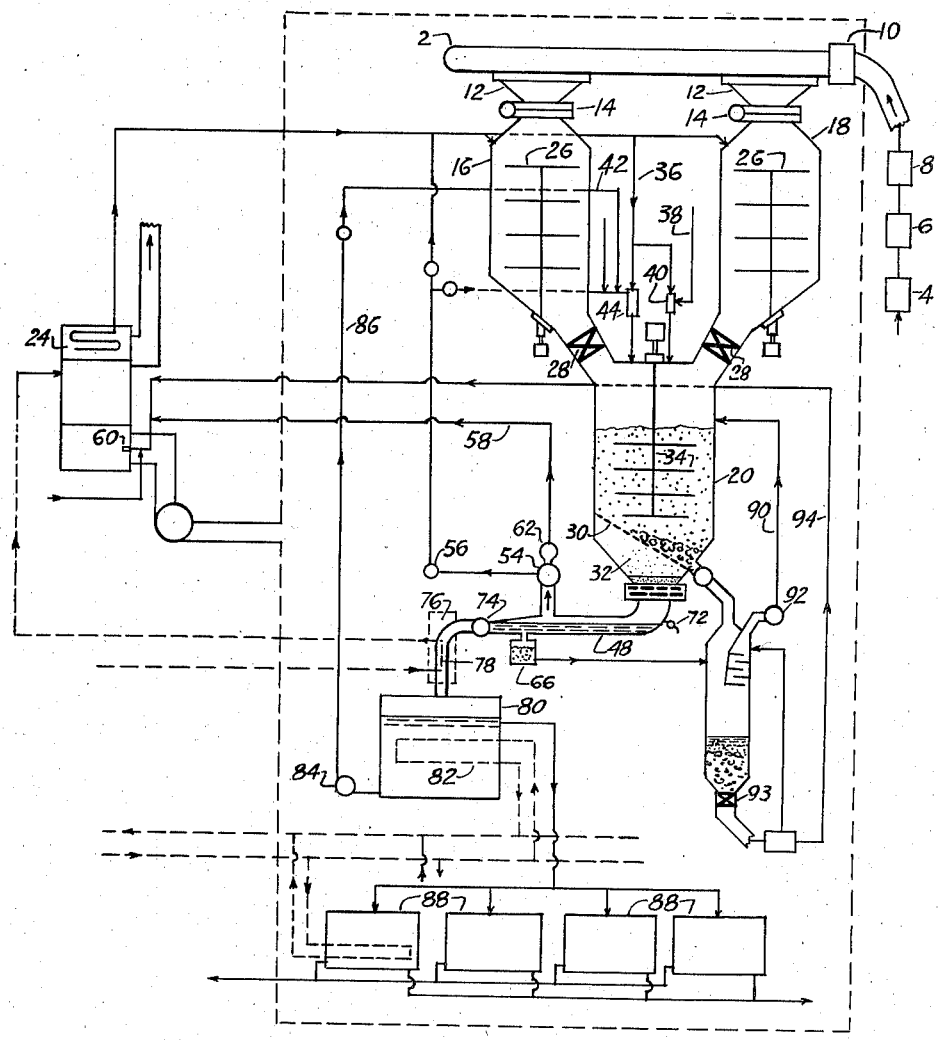

2,198,785

UNITED STATES PATENT OFFICE 2,198,785

METHOD FOR TREATING WASTE MATERIALS

John Mohr and Ernest Lagelbauer, New York, N. Y.

Application June 7, 1937, Serial No. 146,944

2 Claims. (Cl. 127—36)

Our invention relates to the treatment of organic wastes such as garbage and trash or residues from municipal or industrial operations such as sludges, sewage deposits and the like and particularly to methods and means for treating such materials to obtain valuable by-products therefrom, to reduce their bulk and weight and to reduce the cost of disposal thereof. This application is a continuation in part of our copending application, Serial No. 38,338, filed August 29, 1935.

While our invention may be employed in the treatment of a great variety of materials it is particularly adapted for use in disposing of municipal and industrial wastes which today are ordinarily carted to dumps or are burned in incinerators without any effort being made to recover valuable constituents thereof.

Our invention relates primarily to the treatment of materials containing organic substances to hydrolyze the same, by subjecting the material to the action of steam and suitable agents for promoting hydrolyzation. The hydrolyzing of cellulosic materials, such as sawdust, has been suggested heretofore. Methods of hydrolyzing starches and other organic materials, to produce sugars and various intermediate and end products also are well known. However, the conditions of treatment required to hydrolyze cellulose are much more severe than are those required for hydrolyzing starches and serve to cause sugars produced in hydrolyzing starch to be broken down into lower bodies of little if any commercial value. For this reason it has been impossible heretofore to treat materials such as trash and garbage, sewage deposits and other municipal and industrial wastes which contain cellulose together with substantial amounts of starch and other readily hydrolyzable materials in such a way as to obtain a satisfactory high yield of sugars. Prior hydrolyzing processes if applied to trash and garbage would either give a nominal yield of sugars produced from the starches present, leaving the cellulose substantially unconverted, or if carried further, to hydrolyze the cellulose would result in the breaking down of sugars initially present or formed during hydrolyzation into products of little value.

In contrast with prior processes we have developed a method of treating materials, such as municipal and industrial wastes, which contain cellulose together with substantial amounts of readily hydrolyzable materials whereby each of the constituents present is subjected to that hydrolyzing action which is most suitable to effect the conversion thereof into sugars and other by-products without material decomposition or breaking down of the sugars and by-products into lower hydrocarbons or less valuable products.

These advantages of our invention may be obtained by drawing off from the reaction mass or from the chamber in which the reaction takes place, those liquids and soluble substances present or produced during the reaction, as soon as they are formed, while continuing the treatment of the remaining unconverted materials. Sugars initially present or produced in hydrolyzing starch and other readily hydrolyzable materials are recovered in this way before they break down into less valuable products whereas additional sugars and by-products produced in hydrolyzing the cellulose present are also recovered as the reaction proceeds. Thus our method serves to give a high yield of sugars and valuable by-products from materials which heretofore have not been capable of economical or satisfactory treatment by hydrolyzing processes. The sugars recovered may be fermented to produce alcohol or may be used in cattle feed or for other purposes. Additional by-products may also be obtained depending upon the nature of the material treated. Thus when treating sewage deposits, for example, substantial amounts of nitrogen- and sulphur-compounds also may be obtained.

Certain features of our invention are applicable to the treatment of waste materials solely for the purpose of reducing their bulk or altering their form to facilitate disposal thereof. In this respect our invention also may be considered as a disposal process of general application although it is most advantageously applied in recovering valuable by-products from the waste materials treated.

One of the objects of our invention is to provide a novel, economical and sanitary method for the treatment and disposal of organic materials such as municipal and industrial wastes.

Another object of our invention is to provide a process whereby municipal and industrial wastes may be treated to recover valuable by-products therefrom.

A further object of our invention is to provide a method by which organic constituents of waste materials may be hydrolyzed to obtain a high yield of fermentable sugars adapted for use in the production of alcohol as well as other valuable intermediate or end products.

Another object of our invention is to provide novel means for treating organic wastes to dispose thereof easily, economically and in a sanitary manner and by which by-products may be obtained from such materials.

These and other objects and features of our invention will appear from the following description thereof in which typical examples are cited to illustrate the application of our invention to different materials and wherein reference is made to the accompanying figure of the drawing which illustrates diagrammatically one form of equipment that may be used in the practice of our invention.

In accordance with our invention the material to be treated, which for illustration may be considered as composed of garbage and trash as obtained in municipal collections, may be hydrolyzed directly or may be passed through suitable flotation and magnetic separators to remove solid inorganic bodies such as tin cans, iron, stones, bottles and the like. In either case it is preferred that the material be ground or chopped to reduce it to suitable size or form for treatment, say to pieces not exceeding an inch or two in any dimension.

The ground material then is preheated with steam and thereafter is subjected to the hydrolyzing action of steam and dilute acid, preferably in the presence of a suitable catalyst. The temperature to which the material is preheated will vary with the composition of the material and with the subsequent treatment to be given thereto. The nature of the by-products to be recovered and the extent of the conversion desired will also determine to some extent the temperature and pressure used in the preheating operation. However, in general, when treating waste materials to produce fermentable sugars, the temperature and pressure used in the preheating operation are nearly as high as those to which the material is later subjected in the hydrolyzing treatment.

Temperatures ranging from about 130° C. to 190° C. and corresponding steam pressures may be employed for preheating the material and the same or somewhat higher temperatures, say 150° C. to 190° C. may be used in hydrolyzing the material. The initial heating need only be prolonged sufficiently to bring the material to the temperature at which the hydrolyzation process is conducted. This time will vary with the size of the batch and other factors and if desired it may be hastened by stirring or agitating the material in order to enable the steam to reach all parts of the mass very readily. The condensation of steam in giving up heat to the material produces a moist atmosphere in the preheater so that ordinarily dehydrating or breaking down of constituents of the material during the preheating operation into substances which are more difficult to hydrolyze does not occur. However, if sufficient moisture is not present to prevent such decomposition additional moisture may be provided by regulating correspondingly the moisture of the steam introduced for preheating.

In general, the hydrolyzing of the cellulose contained in the material proceeds faster and more nearly to completion when operating at higher pressures and temperatures and therefore the preferred range for the hydrolyzing treatment is from about 8 to 12 atmospheres steam pressure and at temperatures from about 170° to 190° C. While higher temperatures and pressures may be used, the cost of equipment for operating at higher pressures ordinarily is so great as to offset the advantages obtained thereby and the rate at which sugars are broken down to lower bodies is increased. On the other hand, if lower temperatures and pressures are used the length of time required to effect the conversion of substantial proportions of the cellulose into sugars is increased and the operating capacity of the equipment used is correspondingly decreased.

As pointed out above the treatment of the materials is carried out in such a way as to remove the sugars from the hydrolyzing zone prior to decomposition thereof and substantially as rapidly as they are formed. This may be accomplished by continuously or periodically drawing off liquids, including the sugars in solution, from the reaction vessel. The rate of introduction of the steam and reagents into the mass and the moisture content thereof preferably are regulated to provide a reaction mass which is dry or semi-dry near the top but increases in moisture content in passing downward through the mass due to the condensation of steam and the hydrolyzing of constituents of the material being treated. The sugars and soluble substance present and produced during the reaction are thus leached out of the mass by the downwardly flowing liquids so as to be carried into the lower portion of the reaction vessel. The rate of removal of liquids from the reaction vessel may be controlled so that the sugars produced and carried out in solution ordinarily remain in the reaction zone only about 45 seconds to 3 minutes. The temperature of the sugar solution drawn off is then reduced so that the hydrolyzing action is arrested. At the same time the pressure may be reduced and some of the liquids allowed to vaporize. This not only serves to concentrate the sugar solution somewhat but causes the temperature to fall rapidly due to the absorption of sensible heat as latent heat of vaporization in producing steam. An optimum yield of sugars and other valuable by-products is thus obtained and a solution produced which may be fermented to produce alcohol or otherwise treated to recover by-products therefrom.

Any suitable hydrolyzing agent may be used in treating the material and it may be introduced with the steam or may be sprayed into the reaction vessel as a solution or introduced in powdered or granular form. Preferably, the hydrolyzing agent includes a suitable catalyst to hasten the reaction or to aid in breaking down the materials treated in such a way as to produce a greater quantity of one or more desirable products.

Suitable hydrolyzing agents may include dilute inorganic acids such as sulfuric, phosphoric or hydrochloric acids as well as certain organic acids such as methyl or ethyl sulphonic acids. Certain mixtures of acids which are known to be effective hydrolyzing agents and are believed to act catalytically may also be used. Many other catalysts adapted for use in promoting hydrolization of organic substances are known and any of these may be used, care being taken to avoid the use of poisonous catalysts when the sugars obtained are to be used for cattle feed without further purification. Typical of the catalysts that may be used are finely divided metals or their oxides, for example iron or aluminum oxide. Various salts may also be used, of which the chlorides of aluminum calcium and copper, and the sulphides of iron and zinc and tin are representative. When the resulting product is to be fermented for the production of alcohol, calcium phosphate may also be added with the hydrolyzing agent. Calcium phosphate may be produced during the reaction if phosphoric acid is used. In any case its presence is desired in solutions to be fermented and it is believed to act catalytically if present during the hydrolyzing treatment.

The composition of the hydrolyzing agent used will vary in treating different materials and when using different operating conditions, but in general may include from about 0.2 to 4 parts by weight of sulfuric acid, or 0.5 to 7 parts of phosphoric acid or 0.3 to 5 parts of hydrochloric acid, for each 100 parts by weight of the hydrolyzing agent employed. The hydrolyzing agent may also include from 0.2 to 2 parts by weight of aluminum oxide or from 0.5 to 4 parts by weight of iron oxide. From 1 to 5 parts of calcium phosphate may also be added if the sugar solution obtained is to be fermented to produce alcohol.

The process may be carried out continuously or intermittently, as desired or in a semi-continuous manner in which additional material is added from time to time to partially converted material in the reaction vessel. When carried out continuously the amount and character of the reagents introduced and the conditions of operation are maintained substantially constant. However, when batch operation or semi-continuous operation is preferred the amount and character of the reagents employed and the operating conditions may be varied as the operation continues, starting with more dilute or less active hydrolyzing agents, and if desired lower temperatures, and increasing the temperature or the activity of the hydrolyzing agent as the amount of readily hydrolyzable sugars and starches present diminishes. The amount of steam introduced and the rate of removal of liquids from the converter also may be decreased as the operation continues thereby obtaining a sugar solution which is not too dilute and avoiding loss of acid in the solution drawn off. Thus in some cases the initial stages of the treatment are carried out with a very weak hydrolyzing agent and frequent removal of the sugar solution while the final stages are carried on with a stronger or more active hydrolyzing agent and less frequent removal of sugars. However, in any case, whether using batch operation or continuous, or semi-continuous operation, the liquids introduced and formed during the reaction are drawn off to arrest the hydrolyzing action upon soluble substances present in the material or produced during the process and before they undergo undesirable decomposition.

During the treatment the hydrolyzing agent removed with the sugar solution may be separated and recirculated for further treating the cellulose or other materials remaining. If the hydrolyzing agent is of such character that it is not readily separable from the sugars the acid may be neutralized and precipitated as insoluble salts in a settling tank or the salts whether soluble or insoluble may be passed with the sugar solution to fermentation tanks. Ordinarily the catalysts used are in the form of solids and may be separated and returned to the reaction chamber while the remaining unconverted residue may be dried and used as fuel for producing steam for the process.

Any suitable type of apparatus may be used in carrying out the process such as that illustrated diagrammatically in the drawing. In this construction a conveyer 2 carries the waste material from a source of supply 4, passing through magnetic separators 6, and flotation separators 8 if desired. The material then passes to a grinding or comminuting device 10 which serves to reduce the same to about one or two inches in its largest dimention. The cleaned and ground material, or if preferred the material as received directly from the source 4, is discharged by the conveyer into hoppers 12 from which it passes through gate valves 14 or other sealing closures into preheating chambers 16 and 18.

Two preheating chambers are employed so that one may be charged and heated while the other is being discharged. In this way a continuous supply of heated and comminuted material is made available and may be passed to the converter 20 continuously or in batches, as preferred. Steam is supplied to the chambers 16 and 18 from steam line 22 connected to a boiler 24 and if desired suitable agitating means 26 may be provided for stirring the material during the heating thereof.

The heated and comminuted material is passed from the chambers 16 and 18 to a converter 20 or other reaction vessel through suitable valves 28. The converter is equipped with a grate or screen 30 through which liquids and finely divided material pass into the lower portion 32 of the converter while the larger and unconverted material is supported on the screen. The grate may be of any suitable type and may be capable of being agitated to prevent clogging thereof. Suitable stirring or agitating means 34 may also be used to maintain the material in a loose and pervious condition.

Steam from steam line 22 enters the converter through branch line 36, together with the hydrolyzing agent supplied from lines 38, to mixing and control valve 40. Steam together with recirculated hydrolyzing agent and liquids or semisolids recovered from previously treated material and supplied by the line 42 may enter through mixing valve and injector 44.

The liquids, suspended matter and finely divided material passing screen or grate 30 are drawn off from the lower portion 32 of the converter through the valve 46 to a receiver 48 while the unconverted solids and residues of larger dimensions are removed through valve 50 to a drier 52.

From the receiver 48 steam, vapors and gases pass to a condenser 54 which returns the liquids to the converter 20 by pumps 56. Uncondensed gases may be vented or passed through line 58 to the boiler burner 60 or otherwise eliminated. If the vapors contain large amounts of ammonia or other valuable or corrosive constituents these may be recovered or eliminated from the uncondensed gases before they flow to the burner by passage through an absorber or scrubber 62. The temperature of the liquids in receiver 48 is lowered considerably by reducing the pressure so that a portion of the liquids vaporizes taking up sensible heat as heat of vaporization and incidentally concentrating the solution substantially.

A portion of the suspended matter in the liquids in receiver 48 settles into the sump 66. This may include a portion of the catalyst employed in carrying out the operation, in which case the solids and material removed from the sump through line 68 may be treated for the recovery thereof. The remaining solids settling out in the sump pass from line 68 to the drier 52.

Fats, oils and lighter immiscible liquids may be drawn off from receiver 48 through valve 72 whereas the major part of the liquid consisting of the sugars and other by-products in solution pass from the receiver 48 through valve 74 to a cooler 76 where they give up heat to the boiler feed water or are otherwise cooled by a cooling medium passing through the coil 78. The partially cooled liquids then pass into a settling tank 80 where they are further cooled by a coil 82 and further suspended catalyst and other matter are allowed to settle out. The settled material is returned to the converter 20 through the line 86 by pump 84 and injector 44.

The resulting cooled liquor which is now free of solid matter contains the sugars and other by-products in solution together with any acid or hydrolyzing agent which has not previously been removed. The acids may be separated from the sugars by evaporation and returned to the process or they may be neutralized and the resulting salts separated or passed with the sugar solution to fermentation tanks 88 or the liquor may be otherwise treated to recover the sugars and by-products therefrom in commercially valuable forms.

The solids removed from the converter and passing to drier 52 together with any matter received from sump 66 through line 68 are dried by reducing the pressure thereof and drawing off the steam and vapors released through reflux 90 from which the vapors are passed by pump or injector 92 back to the converter 20. The resulting dried solids are comminuted and passed from the drier through valve 93 and line 94 to the boiler burner 60 or they may be discarded directly if of insufficient fuel value.

In this way substantially all of the sugars (glucose) and other soluble products present or formed within the converter are protected from undesirable decomposition into lower and less valuable products and recovered in a valuable form. At the same time the bulk of the material is greatly reduced and its character is so changed that the invention is of great value even when conducted without attempting to recover valuable products. In such cases the resulting materials may be disposed of more readily than heretofore and without giving rise to the unsanitary conditions and high cost now involved in the disposal of municipal and industrial wastes. If it is merely desired to render wastes inoffensive or to reduce their bulk the method can be greatly simplified.

In every case the treatment used and the apparatus employed in the practice of our invention may be varied appropriately according to the nature of the raw material treated and the end products sought. However, in order to illustrate typical procedure in accordance with our invention, the following examples are cited.

Example 1

100 parts by weight of a typical municipal waste containing approximately 7% starches, 2% sugars, 4% fats, 5% proteins, 65% cellulose and 17% inorganic material, are ground to the size of a walnut and preheated to 190° C. in a closed chamber by steam under a pressure of 12 atmospheres. When thoroughly heated the material is introduced in a batch into a converter in which a pressure of 12 atmospheres is maintained. A hydrolyzing agent is introduced with steam to provide a reagent initially comprising about 97% steam (2% moist), ½% sulfuric acid, 2% calcium phosphate and ½% aluminum oxide in parts by weight. The material is stirred during treatment to maintain the mass sufficiently loose to enable steam and liquids to flow downwardly therethrough without being trapped in the converter. In this way the upper portions of the mass are maintained nearly dry whereas the lower portions are moist or wet due to the condensation of steam and hydrolysis of the constituents into liquid or soluble substances. Mixing of the materials in the different layers is avoided so that the liquids from the lower portion of the converter are not carried upward with the material and additional material may be introduced before discharging the unconverted portion of a preceding batch.

Steam and the hydrolyzing agent are introduced and the resulting liquids are drawn from the bottom of the converter at such a rate that sugars produced are removed from the reaction chamber within about 45 seconds to two minutes after their formation. As the reaction continues and after from 5 to 10 minutes of operation the amount of sulfuric acid introduced with the steam is gradually increased to about 1.5% to facilitate hydrolyzing of the cellulose. The treatment is continued for about 1 hour during which time all of the starches and approximately 45% of the cellulose present is converted to sugars, glucose or soluble products which are drawn off in solution.

The total steam required for the reaction equals about 80 to 100% of the weight of the material treated whereas about 1.25 parts of sulfuric acid are used in the treatment of 100 parts of material.

Approximately 47 parts by weight of sugars are obtained from 100 parts of the original trash and garbage. These sugars if fermented yield about 12½ parts by weight of alcohol. About 53 parts of unconverted residue (60% combustible matter) capable of use as low grade fuel are produced and the remainder is obtained in the form of hydrocarbons, fatty acids, soaps, nitro-compounds and inorganic salts which may be separated and recovered for use.

The proteins present are either converted to amino-acids and other nitro-compounds, or are reduced to ammonia, and combine with the hydrolyzing agent to product salts; soluble nitro-compounds formed serve as food for the fermentation microbes used in the fermentation operation. The fats originally present are reduced to simpler fatty acids or soaps and are also drawn off from the converter with the sugar solution.

Example 2

The process described in Example 1 may be carried out in substantially the same manner but as a continuous process by supplying the heated and comminuted material to the converter continuously, using a hydrolyzing agent such as that described but containing approximately 1% of sulfuric acid at all times.

Example 3

The process of Example 1 may be carried out in the manner described using a hydrolyzing agent comprising approximately 3% phosphoric acid and 1.0% iron oxide with 96% steam (2% moist). The amount of either the acid or the iron oxide or both may be increased by 1% as the reaction continues for hydrolyzing the cellulose more effectively and the rate at which steam is introduced is decreased to obtain a solution which when drawn off from the converter is not too dilute.

Example 4

The process of Example 1 may be carried out by preheating the material to 150° C. and thereafter treating the material in the converter with steam at 150° C. for the first 10 minutes of operation after which the pressure and temperature may be increased to those indicated in Example 1.

When treating material having a higher garbage content with more starches and sugars present it is generally possible to use lower pressures and temperatures but somewhat more moisture is required to carry off the sugars rapidly. This may be accomplished by using more steam or by increasing the moisture content thereof or by adjusting both of these factors. While less acid is required for the reaction due to the higher starch content of the material, more acid will be carried out with the sugar solution so that the amount of acid actually employed is substantially the same as that required in treating materials having a lower starch content.

In order to illustrate the process as applied to such materials the following example is cited.

Example 5

100 parts by weight of material containing approximately 12% starches, 5% sugars, 6% fats, 3% proteins, 51% cellulose and 18% inorganic matter are ground and preheated to about 180° C. under a pressure of 10 atmospheres.

The preheated material is introduced into the converter and a hydrolyzing agent is supplied comprising about 97% steam (7% moist), ½% of sulfuric acid, 2% calcium phosphate and ½% aluminum oxide.

After about 5 or 10 minutes of operation the amount of moisture in the steam is reduced to about 2% and the amount of sulfuric acid increased to about 1% of the weight of the steam. The reaction continues for one and a half to two hours drawing off the liquids from the converter periodically or as produced.

The total amount of steam and acid used are substantially the same as in Example 1 namely, 50 to 100 parts of steam and 1.25 to 1.50 parts of sulfuric acid to 100 parts of material treated.

About 45% of the cellulose and substantially all of the sugars and starches are recovered in the solution drawn off; giving a yield of about 30% of sugars together with nitro-compounds and hydrocarbons and leaving a residue of about 26% of materials (50% combustible matter) having low grade fuel value.

When the method is applied to materials other than trash and garbage, such as sewage deposits, sludges and the like it may be necessary to use special equipment to handle the materials and to modify both the treatment and recovery operations in order to avoid decomposition and loss of certain of the values thereof. However, by following the principle of our invention as herein described the invention may be applied to a great variety of materials and particularly to municipal and industrial wastes to obtain valuable by-products therefrom and to dispose thereof in an efficient, economical and sanitary manner. For this reason it should be understood that the apparatus described and the examples of procedure in accordance with our invention as herein cited are intended to be illustrative of our invention and are not intended to limit the scope thereof.

We claim:

1. A method of treating municipal and industrial wastes containing substantial but varying amounts of starches, sugars, and other readily hydrolizable constituents, together with relatively large amounts of cellulose and other constituents which are more difficult to hydrolize, comprising the steps of passing the material to be treated through a reaction zone for a period of from 1 to 6 hours at a temperature between about 150° and 190° C., introducing steam and a hydrolizing agent to said material while in said reaction zone, effecting removal of sugars resulting from the initial conversion of starches and readily hydrolizable constituents of said material within at least three minutes after their formation by withdrawing the liquids and soluble matter from the material in said reaction zone, introducing additional steam and hydrolizing agent to the remaining unconverted material, and affecting removal of the sugars resulting from the conversion of the cellulose and other constituents more difficult to hydrolize within at least three minutes after their formation by withdrawing the liquids and soluble matter from the material in said reaction zone.

2. A method of treating municipal and industrial wastes containing substantial but varying amounts of starches, sugars, and other readily hydrolizable constituents, together with relatively large amounts of cellulose and other constituents which are more difficult to hydrolize comprising the steps of passing the material to be treated through a reaction zone during a period of from 1 to 6 hours at a temperature between about 150° and 190° C., continuously adding steam and a hydrolizing agent to said material while in said reaction zone to thereby effect conversion of the starches, cellulose, and other hydrolizable constituents of said material into sugars, removing said sugars within at least three minutes after their formation by continuously withdrawing the liquids and soluble matter from the materials in said reaction zone, continually adding waste, and continuing the treatment of the unconverted material passing through the reaction zone.

JOHN MOHR.
ERNEST LAGELBAUER.